(12) United States Patent
Seiler et al.

(10) Patent No.: US 11,498,706 B2
(45) Date of Patent: Nov. 15, 2022

(54) EXOTHERMIC REACTION AIDED SPACECRAFT DEMISE DURING RE-ENTRY

(71) Applicant: European Space Agency, Paris (FR)

(72) Inventors: René Seiler, Rijnsburg (NL); Geert Smet, Leiden (NL)

(73) Assignee: European Space Agency, Paris (FR)

(*) Notice: Subject to any disclaimer, the term of this patent is extended or adjusted under 35 U.S.C. 154(b) by 124 days.

(21) Appl. No.: 16/526,489

(22) Filed: Jul. 30, 2019

(65) Prior Publication Data
US 2020/0031502 A1    Jan. 30, 2020

(30) Foreign Application Priority Data
Jul. 30, 2018    (EP) .................................... 18186374

(51) Int. Cl.
*B64G 1/62*     (2006.01)
*B64G 1/64*     (2006.01)
*B64G 1/28*     (2006.01)

(52) U.S. Cl.
CPC ............... *B64G 1/62* (2013.01); *B64G 1/283* (2013.01); *B64G 1/645* (2013.01)

(58) Field of Classification Search
CPC ........... B64G 1/62; B64G 1/283; B64G 1/645
See application file for complete search history.

(56) References Cited

U.S. PATENT DOCUMENTS

| | | | | |
|---|---|---|---|---|
| 5,402,728 A | * | 4/1995 | Garner | B64G 1/645 102/223 |
| 6,766,744 B1 | | 7/2004 | Song et al. | |
| 7,290,737 B2 | * | 11/2007 | Roder | B64G 1/283 244/165 |

(Continued)

FOREIGN PATENT DOCUMENTS

| | | | |
|---|---|---|---|
| DE | 96317 | 3/1895 | |
| FR | 2975079 A1 | * 11/2012 | ............. B64G 1/402 |

(Continued)

OTHER PUBLICATIONS

Machine translation of Reference Dilhan et al. (FR Pub No. 2,975,080) Pub Date Nov. 16, 2012 (Year: 2012).*

(Continued)

*Primary Examiner* — Rodney A Bonnette
(74) *Attorney, Agent, or Firm* — Seed Intellectual Property Law Group LLP

(57) ABSTRACT

A space vehicle element configured to be at least partially destroyed during re-entry of a space vehicle into the atmosphere comprises a heat generating part comprising a metallo-thermal composition for providing additional heat during re-entry of the space vehicle into the atmosphere by an exothermic reaction of the metallo-thermal composition. The destruction of the space vehicle element is expedited by the additional heat provided by the heat generating part. The heat generating part is at least partially integrated within the space vehicle element or at least partially surrounds a portion of the space vehicle element. The application further relates to a corresponding method of manufacturing a space vehicle element configured to be destroyed during re-entry of the space vehicle into the atmosphere.

19 Claims, 7 Drawing Sheets

(56) References Cited

U.S. PATENT DOCUMENTS

| | | | | |
|---|---|---|---|---|
| 2016/0195378 A1* | 7/2016 | Medina | ............... | B64G 1/645 |
| | | | | 244/131 |
| 2017/0284443 A1* | 10/2017 | Von Alberti | ............ | B64G 1/62 |
| 2017/0327251 A1* | 11/2017 | Parissenti | ............ | B64G 1/1021 |

FOREIGN PATENT DOCUMENTS

| | | | | |
|---|---|---|---|---|
| FR | 2975080 A1 * | 11/2012 | ............ | B64G 1/226 |
| FR | 3015437 A1 * | 6/2015 | ............ | B64G 1/64 |
| RU | 2637007 C1 * | 11/2017 | | |

OTHER PUBLICATIONS

Machine translation of Reference Monogarov et al. (RU Pub No. 2,637,007) Pub Date Nov. 29, 2017 (Year: 2017).*

"The Challenge", http://www.esa.int/Our_Activities/Space_Engineering_Technology/Clean_Space/The_Challenge, downloaded Jul. 19, 2019, 4 pgs.

"Design for Demise—A First Look", http://www.esa.int/Our_Activities/Space_Engineering Technology/CDF/Design_For_Demise_A_First_Look, downloaded Jul. 19, 2019, 2 pgs.

THERMIT Trademark Registration, Register No. 42771: https://register.dpma.de/DPMAregister/marke/register/42771/DE?lang=e, downloaded Jul. 19, 2019, 5 pgs.

Wikipedia, "Thermite", https://en.wikipedia.org/wiki/Thermite, downloaded Jul. 19, 2019, 11 pgs.

GlobalSecurity.org, "Information on AN-M14 TH3 Incendiary Hand Grenade", http://www.globalsecurity.org/military/systems/munitions/m14-th3.htm, downloaded Jul. 19, 2019, 2 pgs.

National Aeronautics and Space Administration, "A Demisable-Reactian Wheel Assembly", NASA Publication on Technology Transfer, ref. GSC-14845-1, dated Dec. 16, 2005. 2 pgs.

Nakka, R., "Richard Nakka's *Experimental Rocketry* Web Site, Thermite Experiments", http://www.nakka-rocketry.net/thermites.html, downloaded Jul. 19, 2019, 9 pgs.

* cited by examiner

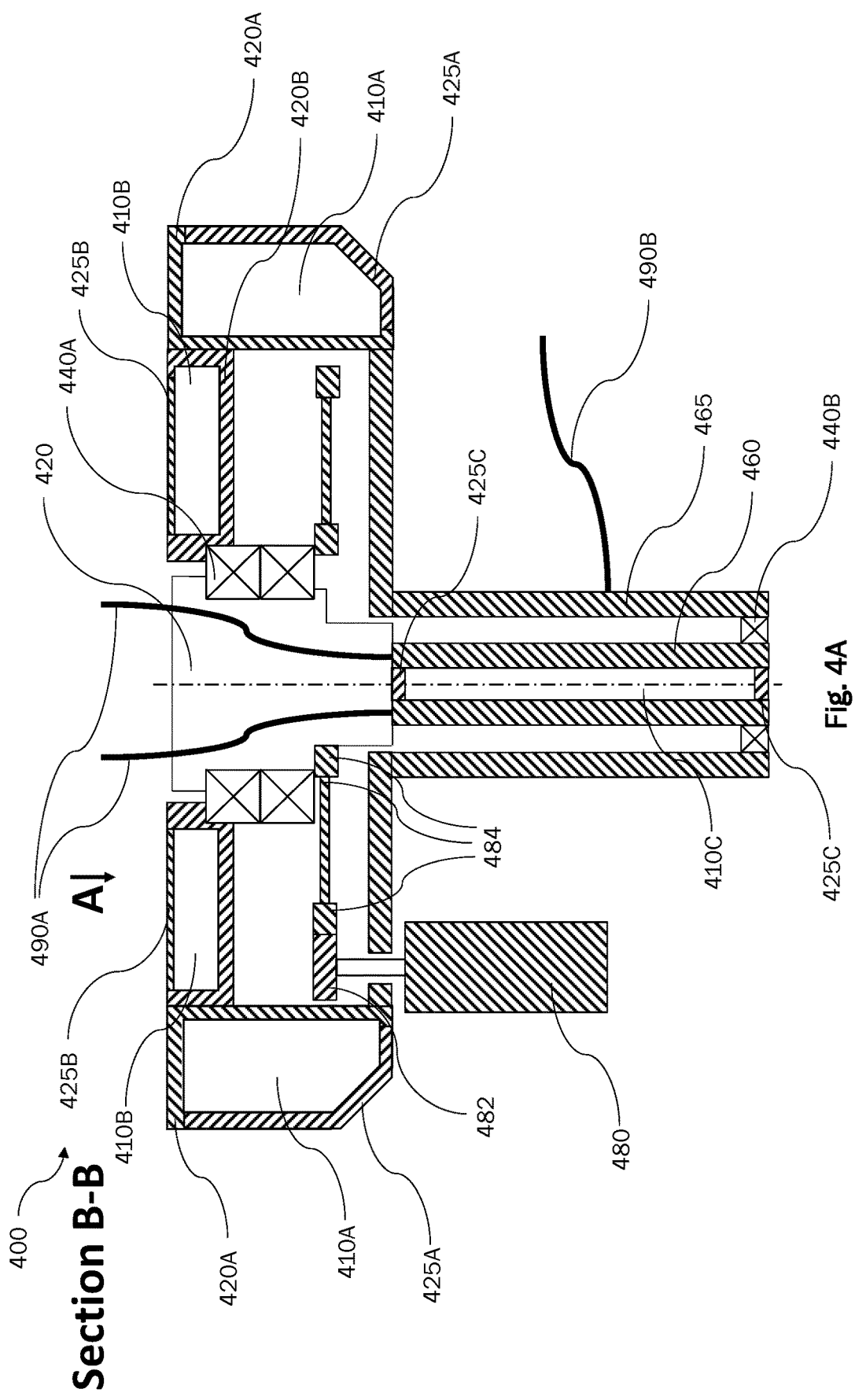

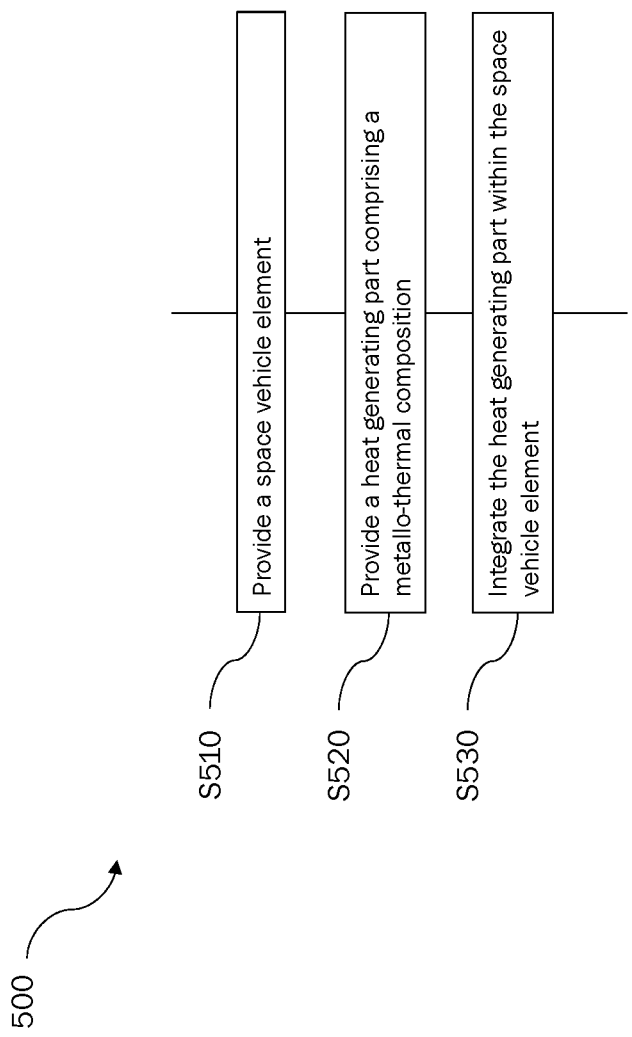

EXOTHERMIC REACTION AIDED SPACECRAFT DEMISE DURING RE-ENTRY

BACKGROUND

Technical Field

This application relates to exothermic reaction aided spacecraft demise during re-entry. In particular, the application relates to space vehicle elements configured to be destroyed during re-entry of the spacecraft (space vehicle) into the atmosphere and to methods of manufacturing such space vehicle elements.

Description of the Related Art

With a view of future space activities, it is desirable to preserve Earth's orbital environment as a safe zone, free of debris. To this end, active efforts are required to remove spacecraft (e.g., satellites or launch vehicles) from orbit. This can be done by means of a controlled re-entry, actively de-orbiting the spacecraft and controlling the area where any debris may end up avoiding populated areas, or uncontrolled re-entry, in which case the risk to people needs to be controlled and minimized. In order to allow for uncontrolled re-entry, spacecraft need to be designed in a way that makes them almost completely demise during re-entry.

Design for Demise (D4D) is a hot topic at the moment as satellite manufacturers try to comply to the recently imposed Space Debris Mitigation requirements. These requirements state that there must be a less than 1 in 10,000 chance of someone being hit by falling space debris. In view of this aim, the space systems industry has been looking at design alternatives that would cause the satellite to disintegrate (demise) during the re-entry into the atmosphere. This demise option presents advantages with respect to other more conventional solutions. For instance, the option of a controlled de-orbit into a safe ocean splash-down could cost as much as 4 or 5 times the propellant needed on board with the consequent increase in satellite size, mass and cost, potentially even requiring a more powerful launcher.

Critical elements (space vehicle elements) in satellite design in the context of demise include titanium propellant tanks, reaction wheels, optical payloads, and balancing masses, for example. Demise of these elements during re-entry could be improved by appropriately adjusting the main factors influencing the survivability of each element. These factors include the material and mass of the element, its geometry or wall thickness, as well as the heat exposure and potential shielding effects induced by other elements of the spacecraft. The D4D approach proposes different solutions ranging from changing the material that critical items are made of, to relocating items to places where they receive more heating effect earlier in the re-entry and even triggering a partial break-up of the satellite structure during re-entry to aid demise. As recent work has shown, doing so can provide real improvements, but does not yet allow to attain the above overall goal with regard to demisability.

Moreover, the current efforts to design for demise require significant changes to existing spacecraft equipment. This can lead to costly development and qualification programs, dedicated to each specific type of equipment. Furthermore, it may be required to make concessions on the performance of the unit. For example, an avenue investigated for reaction wheels is to use smaller wheels spinning at higher speeds. Whereas this does somewhat improve the demisability, it has an impact on performance parameters such as the exported microvibration and the power consumption.

As noted above, recent work has shown that the currently explored methods for making spacecraft equipment more demisable may not be sufficient. Specifically, for reaction wheels, it has turned out that the ball bearing assembly for flywheel suspension does survive, even for reaction wheel designs optimized for demisability. Thus, more drastic changes may be required in order to fully demise this type of equipment, which could imply moving away from design solutions with decades of heritage.

It is also clear that some units use materials which are hard to demise, for which no other option exists due to other design constraints. Mechanisms often use steel ball bearings, housed in steel or titanium parts. These materials are necessary to provide the required mechanical strength, stiffness and lifetime performance of these units and cannot be replaced. Similarly, optical payloads also often use materials which are hard to demise, and cannot be replaced as they are required to meet the desired performance, for example thermo-elastic stability.

Another approach to improve demisability could be to try to ensure early break-up of the spacecraft structure. Current methods to help break up the spacecraft structure may be insufficient, however. For example, one design methodology could be to make use of Shape Memory Alloys (SMA) to break structural joints. This is a fully passive system, activated by the heat generated during re-entry. The Technology Readiness Level (TRL) for this solution is currently still low, and the impact on structural performance of the spacecraft needs to be assessed in greater detail. Moreover, SMA actuator solutions do not address the issue of harness and propulsion pipework which may hamper a controlled break-up of the structure.

Thus, there is a need for a new and improved techniques to demise spacecraft equipment. There is particular need for such techniques that do not impose additional design constraints on space vehicle elements.

BRIEF SUMMARY

In view of some or all of these needs, the present disclosure proposes a space vehicle element and a method of manufacturing a space vehicle element, having the features of the respective independent claims.

An aspect of the disclosure relates to a space vehicle element configured to be at least partially destroyed or demised during re-entry of the space vehicle (spacecraft) into the atmosphere. Here, at least partial destruction or demise is understood to include, for example, full destruction, partial destruction, or severing the space vehicle element into two or more parts, possibly followed by destruction or partial destruction of the individual parts. In particular, it may be understood that any remainder of the space vehicle element upon impact on the ground may have a reduced impact energy, with an aim to reduce it below 15J per impacting part (the amount of energy considered critical in case of collision with a human being). The space vehicle may be a satellite, for example. The space vehicle element may include a heat generating part. The heat generating part may include (or in some cases consist of) a metallo-thermal composition for providing additional heat during re-entry of the space vehicle into the atmosphere. The additional heat may be provided by an exothermic reaction of the metallo-thermal composition. Destruction of the space vehicle element may be expedited by the additional heat provided by the heat generating part. The heat generating part may be integrated, fully or at least partially, within the space vehicle element. Accordingly, at least a portion of the heat generating part may be arranged inside of the space vehicle element, e.g., away from a surface of the space vehicle element. Alternatively, the heat generating part may be arranged to surround (e.g., encircle, enclose), fully or at least partially, a portion of the space vehicle element. The metallo-thermal composition may comprise a mixture of a metal (e.g., in powder form) and a metal oxide (e.g., in powder form), for example aluminum and iron oxide, and possibly a binder. As such, the metallo-thermal composition may be equivalent to a pyrotechnic composition of metal powder. One example of a metallo-thermal composition is thermite.

Configured as described above, the proposed solution offers a new technique to demise spacecraft equipment (space vehicle elements), by adding energy to the system in order to help demise elements of existing designs, although incorporating it in new designs is also perfectly possible and appropriate. This is achieved by providing a metallo-thermal composition that is capable of an exothermic reaction once ignited, at least partly integrated with the space vehicle element or at least partially surrounding a portion of the space vehicle element. The heat generating part can correspond to a cartridge of thermite or a thermite-like substance. The benefit of this approach is that the impact on the design should be minimal. The mass and volume taken up by such heat generating part should be sufficiently small to minimize the impact on the design of the equipment, while providing sufficient energy to ensure the demise. The actuation of the heat generating parts can be completely passive, as ignition relies on the heat generated during re-entry.

In some embodiments, the heat generating part may be arranged (e.g., inserted) in a recess or cavity provided in the space vehicle element. The heat generating part may be arranged in a hollow, clearance, opening, etc., of the space vehicle element. Accordingly, the footprint of the space vehicle element is not altered. Moreover, heat transfer from the heat generating part to the space vehicle element during re-entry is optimized, while minimizing the additional material added, thus improving demise of the space vehicle element.

In some embodiments, the heat generating part may be arranged in contact (including in thermal contact) with a connecting section between a first part of the space vehicle element and a second part of the space vehicle element. Then, the additional heat provided by the heat generating part may expedite severing the connecting section during re-entry of the space vehicle into the atmosphere. The connecting section may be a joint or an interface (including the regular/typical mechanical mounting interfaces of space vehicle equipment), for example. Specifically, the connecting section may be a wire harness, a propulsion pipe, or a heat pipe, etc. Severing the connecting section may separate the first part and the second part or at least contribute to severing the first part and the second part. The connecting section may relate to a structural connection, i.e., the mechanical interface between the element and the space vehicle, or to a secondary connection, such as harness, pipework, etc. The latter are not meant to take mechanical loads under normal circumstances, but can become the primary connection during re-entry if the structural connection has already failed. Notably, heat generating parts can be simply added to any existing type of structural joint with little impact on the overall design.

In some embodiments, the heat generating part may be shaped to at least partially enclose the connecting section between the first part of the space vehicle element and the second part of the space vehicle element. The heat generating part may have annular or semi-annular shape, for example. For instance, the heat generating part may be arranged to sever the space vehicle element from its connector (interface) that couples the space vehicle element to a harness or to pipework. By at least partially enclosing the connecting section, heat transfer from the heat generating part to the connecting section can be optimized and the connecting section can be severed in a predictable (e.g., controlled) and reliable manner. Also, such heat generating part can be applied to, for example, harness and pipework in a simple manner, such as by clamping.

In some embodiments, the second part may be a fixation part for fixing the space vehicle element to a portion of the space vehicle. Accordingly, the space vehicle element can be reliably and predictably severed from the space vehicle during re-entry.

In some embodiments, the space vehicle element may further include a second heat generating part. The second heat generating part may include a second metallo-thermal composition for providing additional heat during re-entry of the space vehicle into the atmosphere by an exothermic reaction of the second metallo-thermal composition. The second heat generating part may be arranged in contact (including in thermal contact) with one of the first part or the second part of the space vehicle element, for expediting the destruction of the one of the first part or the second part of the space vehicle element by the additional heat provided by the second heat generating part. In some embodiments, the space vehicle element may comprise more than the first and second heat generating parts. Accordingly, a large space vehicle element can be broken up during re-entry and the resulting part of the space vehicle element can be individually demised, thereby improving the overall demise of the space vehicle element.

In some embodiments, the second heat generating part may be configured such that the exothermic reaction of the second metallo-thermal composition is activated after the exothermic reaction of the first metallo-thermal composition is activated. Thereby, the second heat generating part may provide the additional heat for expediting the destruction of the one of the first part or the second part of the space vehicle element after the connecting section between the first part and the second part of the space vehicle element has been severed.

In some embodiments, the heat generating part may be arranged in a vicinity of a structural connection between the space vehicle element and the space vehicle. Thereby, severing the structural connection during re-entry of the space vehicle into the atmosphere may be expedited by the additional heat provided by the heat generating part. In some implementations, the heat generating part may be arranged in such way as to break the structural connection between the space vehicle element and the space vehicle. To this end, the heat generating part may be shaped to at least partially enclose the structural connection.

In some embodiments, the space vehicle element may further include a second heat generating part. The second heat generating part may include a second metallo-thermal composition for providing additional heat during re-entry of the space vehicle into the atmosphere by an exothermic reaction of the second metallo-thermal composition. Destruction of the space vehicle element may be expedited by the additional heat provided by the second heat generating part. The first and second heat generating parts may be configured such that the exothermic reactions of their respective metallo-thermal compositions are activated in a predetermined sequence and/or with predetermined relative timing (e.g., with a predetermined sequence between respective activations). In some embodiments, the space vehicle element may comprise more than two heat generating parts and these more than two heat generating parts may be arranged/configured to ignite in a predetermined sequence. Thereby, breakup of the space vehicle element into pieces and individual demise of those pieces during re-entry can be effected according to a predetermined, optimized scheme, ensuring optimum demise of the space vehicle element during re-entry.

In some embodiments, the heat generating part may be configured such that the metallo-thermal composition is ignited by a thermal flux created by atmospheric friction during re-entry of the space vehicle into the atmosphere. The heat generated during the re-entry will be conducted through the space vehicle element and will eventually create a sufficiently high temperature and heat density to achieve ignition of the metallo-thermal composition. The heat generating part may be specifically arranged and configured to achieve this aim. That is, the heat generating part may be designed (e.g., with regard to the composition of the metallo-thermal composition), partly in dependence on an arrangement of the heat generating part within the space vehicle (e.g., in dependence on its distance from a surface of the space vehicle element, etc.). This avoids the need for fuses or other means for actively igniting the metallo-thermal composition of the heat generating part.

In some embodiments, the space vehicle element may further include a fuse for igniting the metallo-thermal composition. The fuse may be thermally coupled to the heat generating part. The fuse may be activated by a thermal flux created by atmospheric friction during re-entry of the space vehicle into the atmosphere. Accordingly, the metallo-thermal composition can be reliably ignited during re-entry of the space vehicle into the atmosphere.

In some embodiments, the fuse may include a heat conducting part for transferring heat generated by the thermal flux to the heat generating part, for activating the exothermic reaction of the metallo-thermal composition. Such a fuse may be referred to as a passive fuse. The (passive) fuse may be or comprise a copper element (e.g., a rod), for example, or an element formed of any other material with good heat conductivity and sufficiently high melting/disintegration temperature (e.g., higher than the ignition temperature of the metallo-thermal composition it is supposed to ignite). One end of the (passive) fuse may reach closer towards a surface of the space vehicle than the heat generating part. The heat conducting element can be configured in such a way to optimize the ignition, for example by maximizing the contact area between the heat conducting element and the metallo-thermal composition (i.e., the heat generating part). Thereby, the metallo-thermal composition can be ignited in a simple and efficient manner.

In some embodiments, the fuse may include two separated chambers having contained therein respective agents (e.g., chemical agents). The fuse may further include a dividing section (e.g., a dividing wall) arranged between and separating the chambers. The agents may mix if the dividing section is made permeable or destroyed. The two agents may be chosen to spontaneously ignite and undergo an exothermic reaction when being brought into contact with each other. The agents may undergo a so-called hypergolic reaction. The exothermic reaction may generate sufficient heat/energy to start the reaction of the metallo-thermal composition or ignite the metallo-thermal composition. The fuse may be configured such that the dividing section is made permeable or destroyed by the heat generated by the thermal flux. The dividing section may be configured to be made permeable or destroyed at a predetermined, tunable temperature (e.g., tunable by choice of material, thickness, etc., of the dividing section). For example, the dividing section may have a predetermined melting temperature, which may be lower than the ignition temperature of the metallo-thermal composition. It is understood that the casing of the two separated chambers other than the dividing section is configured (e.g., by choice of material and/or thickness) to not be made permeable or destroyed by the thermal flux until after the dividing section is made permeable, so that the two agents can mix and react with each other. Using such a fuse, sufficient heat for igniting the metallo-thermal composition can be provided and the metallo-thermal composition can be ignited in a reliable and efficient manner at a point where the temperature of the space vehicle element and the metallo-thermal composition is still lower than the ignition temperature of the metallo-thermal composition.

In some embodiments, the fuse may include a pyrotechnic or metallo-thermal composition coating. Optionally, the fuse may further include a metal wire, at least partially coated by the pyrotechnic or metallo-thermal composition. In some sense, this fuse may be seen as resembling a sparkler. The metal wire can be formed as needed for the specific application, for example to reach from the heat generating part towards an outer surface of the space vehicle where the heat generated by atmospheric friction is sufficient to ignite the coating. Then, the coating would burn up along the metal wire, eventually igniting the metallo-thermal composition of the heat generating part. Using such a fuse, the metallo-thermal composition can be ignited in a simple and efficient manner at a point where the temperature of the space vehicle element and the metallo-thermal composition is still lower than the ignition temperature of the metallo-thermal composition.

In some embodiments, the space vehicle element may be a reaction wheel that is usable for maneuvering of the space vehicle. The reaction wheel may include a ball bearing assembly. The heat generating part may be arranged along a center of the ball bearing assembly. In this implementation, demise of the reaction wheel, which is a massive component of any space vehicle, can be reliably effected. Since the heat generating part is arranged along the center of the ball bearing assembly, no additional space is required for the heat generating part, and heat transfer to the ball bearing assembly is optimized.

In some embodiments, the space vehicle element may be a solar array drive mechanism for driving a solar array of the space vehicle. The heat generating part may be arranged in a rotor shaft of the solar array drive mechanism or between stiffening ribs of a structural component of the solar array drive mechanism. The structural component may be an adapter, for example. In this implementation, demise of the solar array drive mechanism can be reliably effected. Since the heat generating part is arranged in the rotor shaft of the solar array drive mechanism or between stiffening ribs of the structural component of the solar array drive mechanism, no additional space is required for the heat generating part. Also, heat transfer to the solar array drive mechanism can be optimized.

Another aspect of the disclosure relates to a method of manufacturing a space vehicle element. The space vehicle element may be configured to be destroyed during re-entry of the space vehicle into the atmosphere. The method may include providing a heat generating part comprising a metallo-thermal composition for providing additional heat during re-entry of the space vehicle into the atmosphere by an exothermic reaction of the metallo-thermal composition. Destruction of the space vehicle element may be expedited by the additional heat provided by the heat generating part. The method may further include integrating the heat generating part within the space vehicle element.

It will be appreciated that apparatus features and method steps may be interchanged in many ways. In particular, the details of the disclosed apparatus (e.g., space vehicle element) can be realized by the corresponding method of manufacturing the apparatus, and vice versa, as the skilled person will appreciate. Moreover, any of the above statements made with respect to the apparatus are understood to likewise apply to the corresponding manufacturing method, and vice versa.

BRIEF DESCRIPTION OF THE SEVERAL VIEWS OF THE DRAWINGS

Example embodiments of the disclosure are explained below with reference to the accompanying drawings, wherein.

DETAILED DESCRIPTION

Figure 1:
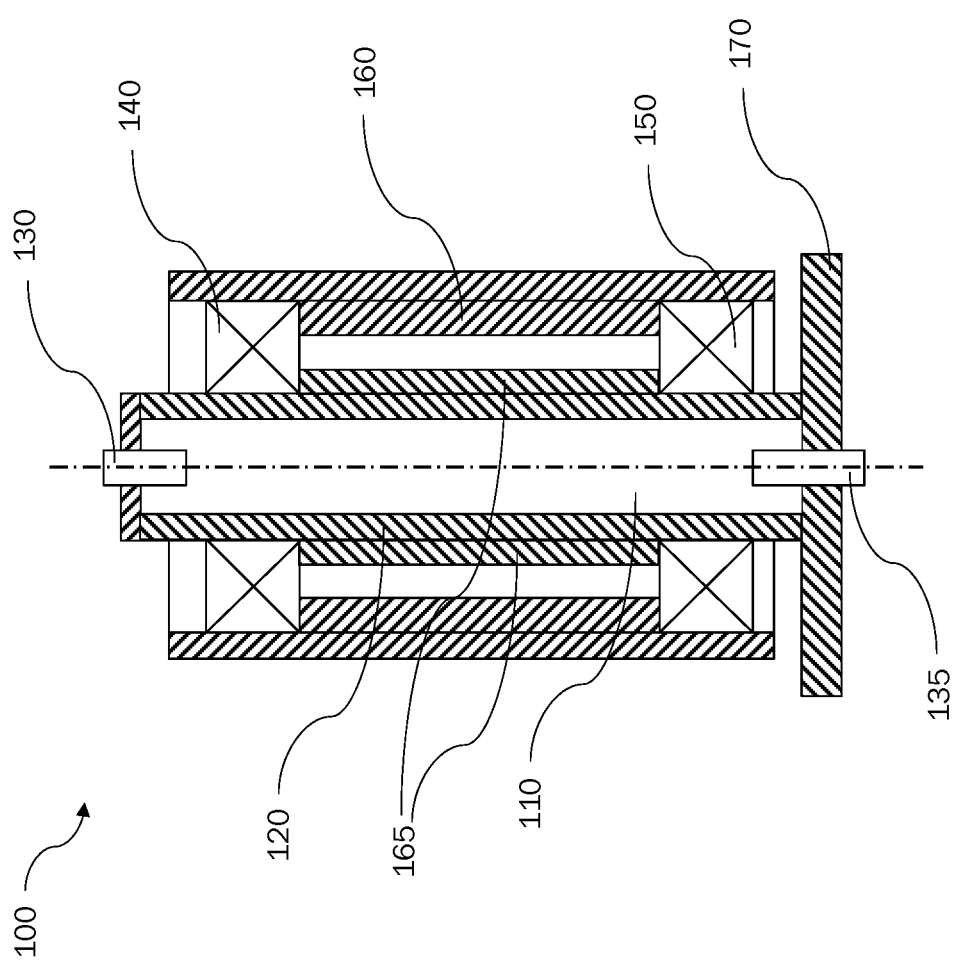
FIG. 1 schematically illustrates a first example of a space vehicle element according to embodiments of the present disclosure, FIG. 2 schematically illustrates a second example of a space vehicle element according to embodiments of the present disclosure, FIG. 3 schematically illustrates a third example of a space vehicle element according to embodiments of the present disclosure, FIG. 4A, FIG. 4B, and FIG. 4C schematically illustrate views of a fourth example of a space vehicle element according to embodiments of the present disclosure, and FIG. 5 schematically illustrates an example of a method of manufacturing a space vehicle element according to embodiments of the present disclosure.

In the following, example embodiments of the disclosure will be described with reference to the appended figures. Identical elements in the figures may be indicated by identical reference numbers, and repeated description thereof may be omitted.

Uncontrolled spacecraft (space vehicle) re-entry requires the spacecraft (e.g., satellite) to sufficiently demise in order to meet the casualty risk requirement. The heat generated during re-entry is not sufficient for demise of certain types of equipment present on a typical spacecraft. For example, some equipment (e.g., large mechanisms, propulsion tanks, magnetorquers, etc.) is hard to demise without big design changes as the functionality, load capacity, and other aspects require the use of metals with high melting temperatures. As has also been found, earlier break-up of structural joints, harness, and pipework is beneficial for the overall demisability.

Broadly speaking, in various embodiments of the present disclosure, energy is added to the system to aid the demise process. Currently, spacecraft demise relies purely on the heat generated during atmospheric re-entry. By contrast, the present disclosure uses metallo-thermal compositions (e.g., thermite or thermite-like substances) to generate heat during re-entry. The use of metallo-thermal compositions (providing both reactant and oxidant in a mixture) is chosen for its safety and limited mass impact. A metallo-thermal composition is physically and chemically inert at temperatures typically encountered during a spacecraft mission. The only way to ignite it on a spacecraft is by exposing it to very high temperatures, which only occur during re-entry. One aspect of this disclosure is that both reactant and oxidant are present in the mixture, as insufficient oxygen is available in the re-entry plasma to sustain a stable reaction (combustion).

As such, the present disclosure provides a paradigm shift from trying to design all equipment for demise, to demising existing equipment with minor changes leveraging existing heritage, although incorporating it in new designs is also perfectly possible and appropriate. The present disclosure therefore can be applied to a multitude of different products and space vehicle elements.

While thermite may be referred to frequently throughout the present disclosure, it is to be understood as a non-limiting example of a metallo-thermal composition. As is readily apparent to a skilled person, the present disclosure is applicable to all sorts of metallo-thermal compositions. What is common to the metallo-thermal compositions usable in the context of the disclosure is that they are capable of an exothermic reaction and that both reactant and oxidant are present in the mixture, as insufficient oxygen is available in the re-entry plasma to sustain a stable reaction to burn metals. For instance, the metallo-thermal composition may comprise a mixture of a metal (e.g., in powder form) and a metal oxide (e.g., in powder form), e.g., aluminum and iron oxide (e.g., thermite), and possibly a binder. As such, the metallo-thermal composition may be equivalent to a pyrotechnic composition of metal powder, and the present disclosure may be generally said to be generally applicable to pyrotechnic compositions of metal powder.

The exothermic reaction of thermite is also referred to as a Goldschmidt process. Its classic use is found in alumino-thermic welding, such as to join rail tracks. The original patent by Hans Goldschmidt dates back to 1895 ("Verfahren zur Herstellung von Metallen oder Metalloiden oder Legierungen derselben", Deutsches Reich Patent no. 96317, 13 Mar. 1895). In fact, THERMIT is registered as a trademark by Elektro-Thermit GmbH & Co. K G, Halle in Germany. Other known applications of thermite-like mixtures comprise the construction and repair of large metal structures (e.g., in shipbuilding), metal refining, and various military applications, for instance incendiary weapons, demolition of ammunition, underwater incendiary devices, etc., (mostly with thermate, a variation of thermite).

Thermite is a composition of metal powder and metal oxide (typically also in powder form). When ignited by heat, it undergoes a (non-explosive) exothermic reduction-oxidation (redox) reaction. The most common form of thermite consists of red iron(III) oxide (equivalent to rust) and aluminum powder, mixed with a binder to keep the material solid and prevent separation of the reactants. However, many different compositions of thermites are possible. This allows for some design freedom. Mixtures can be tuned for different ignition temperatures, or different amounts of energy can be released. In addition, there is room for design flexibility to take into account other requirements, e.g., ferromagnetic properties of the mixture. Other parameters can be controlled as well. For example, the reaction rate can be tuned by changing the particle size in the mixture. This can help yield better control over the demise of the unit. These considerations also hold true for metallo-thermal compositions and pyrotechnic compositions of metal powder in general.

It is important to note that the rate of energy release and, to some degree, the ignition temperature of a metallo-thermal composition can be tailored by appropriate choice of the size and/or shape of the particles in the metallo-thermal composition. Likewise, the rate of energy release and ignition temperature can also be adjusted by appropriate choice of the composition. At this, it is preferable that the rate of energy release by the metallo-thermal composition is (substantially) higher than the rate of radiative heat loss in order to gain a (significant) temperature increase to reach the melting point of the material to be demised.

As noted above, the present disclosure endeavors to add pyrotechnic compositions of metal powder, such as metallo-thermal compositions (e.g., thermite or thermite-like substances) to spacecraft equipment to help achieve their demise during re-entry. This can be in the form of cartridges containing the mixture. According to the disclosure, a heat generating part that comprises the metallo-thermal composition (e.g., a cartridge containing the metallo-thermal composition) is incorporated directly into the structural elements of such equipment. Any such heat generating part (e.g., a cartridge) will be ignited by the heat generated during the re-entry of the spacecraft. The design is therefore fully passive and very safe to use as it will only encounter the required conditions to ignite during re-entry.

In line with this scheme, the present disclosure proposes a space vehicle element configured to be destroyed (demised) during re-entry of the space vehicle into the atmosphere. The space vehicle element comprises a heat generating part comprising a metallo-thermal composition for providing additional heat during re-entry of the space vehicle into the atmosphere by an exothermic reaction of the metallo-thermal composition, for expediting the destruction of the space vehicle element by the additional heat provided by the heat generating part. The heat generating part can be a cartridge including the metallo-thermal composition, for example.

The heat generating part is integrated within (i.e., at least partially inside) the space vehicle element. As such, the heat generating part can be somewhat removed from a surface of the space vehicle element. That is, at least a portion of the heat generating part may be arranged inside of the space vehicle element, away from a surface of the space vehicle element. This implies that (at least a portion of) the heat generating part may not be visible from the outside. In some implementations, the heat generating part is arranged (e.g., inserted) in a recess or cavity already present or provided for this purpose in the space vehicle element. Accordingly, the heat generating part may be arranged in a hollow, clearance, opening, etc., of the space vehicle element. Non-limiting examples of such arrangement will be provided below. Alternatively, the heat generating part may at least partially surround a portion of the space vehicle element, such as a connecting section, for example.

If the heat generating part is (at least in part) integrated with the space vehicle element, the required additional material to house the heat generating part is minimized. This aids to minimize the overall amount of material that is to be demised during re-entry. Moreover, the heat participating in heating the space vehicle element is maximized, i.e., heat transfer between the heat generating part and the space vehicle element is maximized. As such, the heat generating part achieves direct heat transfer to the space vehicle element. If the heat generating past surrounds a portion of the space vehicle element, heat transfer to that portion of the space vehicle element is optimized as well. This arrangement may be used for severing the space vehicle element, or for severing the space vehicle element from the space vehicle.

Practical applications of this type of technology include but are not limited to the following examples of space vehicle elements: demisable reaction wheels or other, relatively large mechanisms, demisable optical equipment or payloads, demisable magnetorquers, demisable optical equipment, demisable equipment in general, demisable structural joints for spacecraft break-up, electrical harness and propulsion/heat pipes that need to be cut for spacecraft break-up.

Next, non-limiting examples for an arrangement of a heat generating part relative to a space vehicle element will be described with reference to FIG. 1, FIG. 2, FIG. 3, and FIGS. 4A-C.

FIG. 1 schematically illustrates a ball bearing assembly 100 of a demisable reaction wheel as an example of a space vehicle element. Accordingly, the space vehicle element may be a ball bearing assembly or a reaction wheel comprising a ball bearing assembly. The ball bearing assembly 100 includes a first ball bearing 140, arranged at or towards an end of a stationary shaft 120. The ball bearing assembly 100 further includes a second ball bearing 150 arranged at or towards the opposite end of the shaft 120. The ball bearing assembly 100 further comprises additional ball bearing assembly parts 160, connected to the outer race of the ball bearings and therefore free to rotate, as well as a mounting interface or mounting flange (support infrastructure) 170 coupled to an end of the rotatable shaft 120. The ball bearing assembly 100 further comprises a spacer 165 arranged between the stationary shaft 120 and the additional ball bearing assembly parts 160.

In the example of FIG. 1, the heat generating part 110 (e.g., cartridge including a metallo-thermal composition) is fully integrated in the center of the ball bearing assembly 100 in order to control the release of heat and the gradual melting of the entire ball bearing assembly 100 as much as possible, propagating from inside to outside. In this configuration, the shaft 120 might be said to serve as a casing or enclosure for the heat generating part 110.

Optionally, the ball bearing assembly 100 may further comprise one or more fuses 130, 135 for igniting the metallo-thermal composition of the heat generating part 110. In terrestrial applications, either sparklers or magnesium strips or ribbons are commonly used as fuses (since, e.g., thermite would be very difficult to ignite otherwise). Fuses of such or other suitable composition might optionally be considered in design-for-demise solutions, in order to control the exact location of thermite ignition, to expedite the ignition and, hence, to optimize the timing of the melting process during re-entry (if necessary). Further examples of suitable fuses will be described in more detail below.

Summarizing the example of FIG. 1, the space vehicle element can be a reaction wheel that is usable for maneuvering the space vehicle and that comprises a ball bearing assembly. Alternatively, the space vehicle element can be a ball bearing assembly of a reaction wheel. In this configuration, the heat generating part can be arranged along a center of the ball bearing assembly, for example within a stationary shaft of the ball bearing assembly.

As indicated above, earlier break-up of structural joints, harness and pipework during re-entry can be beneficial for the overall demisability. Appropriate arrangement of the heat generating part can help to attain this goal.

For example, the heat generating part can be arranged in contact (including in thermal contact) with a connecting section between a first part of the space vehicle element and a second part of the space vehicle element, so that the additional heat provided by the heat generating part expedites severing the connecting section during re-entry of the space vehicle into the atmosphere. Preferably, contact between the heat generating part and the connecting section creates a thermal path/link between the heat generating part and the connecting section. Severing the connecting section may separate the first part and the second part. The connecting section can be a joint or an interface (including the regular/typical mechanical mounting interfaces of space vehicle equipment), for example. The connecting section may relate to a structural connection, i.e., the mechanical interface between the element and the space vehicle, or a secondary connection, such as a harness, pipework (e.g., propulsion pipes, heat pipes), etc. The latter are not meant to take mechanical loads under normal circumstances, but can become the primary connection during reentry if the structural connection has failed. If there is more than one connecting section between the first part and the second part, multiple heat generating parts can be arranged in contact (including in thermal contact) with respective connecting sections.

Heat transfer between the heat generating part and the connecting section can be improved if the heat generating part is shaped to at least partially surround (i.e., encircle or enclose) the connecting section between the first part of the space vehicle element and the second part of the space vehicle element. To this end, the heat generating part may have annular or semi-annular shape, for example.

Figure 2:
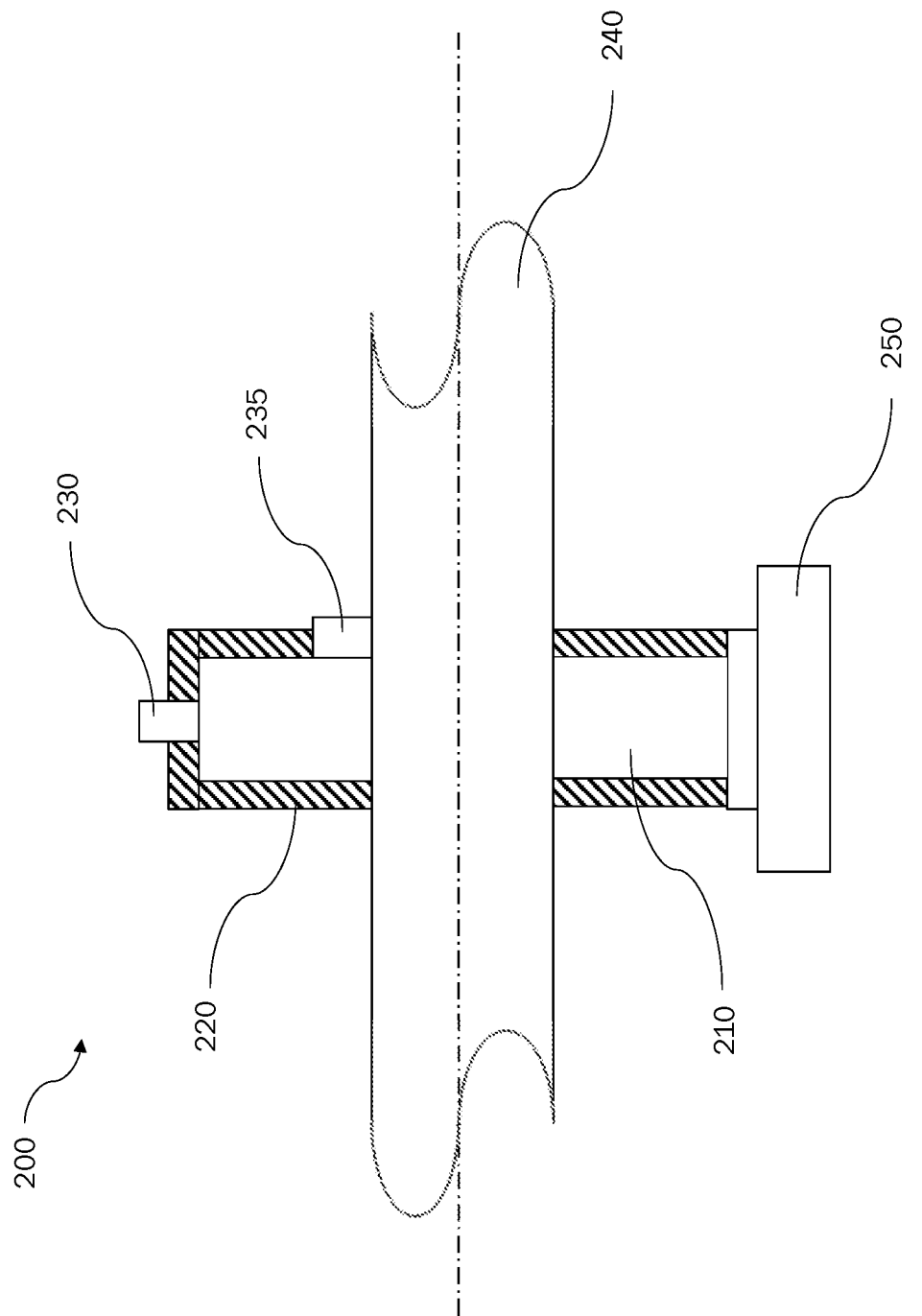

An example of such configuration is schematically illustrated in FIG. 2, which shows, as a part of a space vehicle element 200, a connecting section 240 between a first part of the space vehicle element 200 (e.g., to the left of the connecting section 240) and a second part of the space vehicle element 200 (e.g., to the right of the connecting section 240). In the example of FIG. 2, the connecting section 240 is an electrical harness or fuel pipe. The heat generating part 210 (e.g., a thermite cartridge) is arranged to enclose the connecting section 240. While FIG. 2 shows a section through the connecting section 240 and the heat generating part 210, the heat generating part 210 may be understood to encircle the connecting section 240, i.e., to extend along a full circumference of the connecting section 240. As such, the heat generating part 210 serves as a cutter for the electrical harness or fuel pipe. For example, the heat generating part 210 can have annular shape and encircle the connecting section 240. Such annular heat generating part could be slid on the harness or pipe during the assembly process. Alternatively, if the annular heat generating part is made into halves, it can be clamped onto the harness or pipe at a later stage.

The heat generating part 210 can include a casing 220. This casing could be very thin and light. Additionally, the space vehicle element 200 can include one or more optional fuses 230, 235 arranged in close proximity of the heat generating part 210, for igniting the metallo-thermal composition of the heat generating part 210. Yet further, the space vehicle element 200 can include a mounting interface (support structure) 250 for supporting the connecting section 240, if needed, especially if the heat generating part 210 is relatively large and heavy (subject to its sizing with respect to the diameter and material of the connecting section 240). The link between the space vehicle element 200 and the support structure 250 can further improve the thermal connection and aid the heat transfer and therefore expedite the ignition of the heat generating part.

Depending on circumstances, it may also be necessary to sever the space vehicle element from the space vehicle. Accordingly, in some embodiments the second part of the space vehicle element can be a fixation part for fixing the space vehicle element to a portion of the space vehicle. Then, the heat generating part is arranged in a vicinity of a structural connection between the space vehicle element and the space vehicle, such that severing the structural connection during re-entry of the space vehicle into the atmosphere is expedited by the additional heat provided by the heat generating part. In some implementations, the heat generating part may be arranged in such way as to break the structural connection between the space vehicle element and the space vehicle. Also, the heat generating part may be arranged to sever the space vehicle element from its connector (interface) that couples the space vehicle element to a harness or to pipework. As in the example of FIG. 2, the heat generating part may be shaped to at least partially enclose the structural connection.

Figure 3:
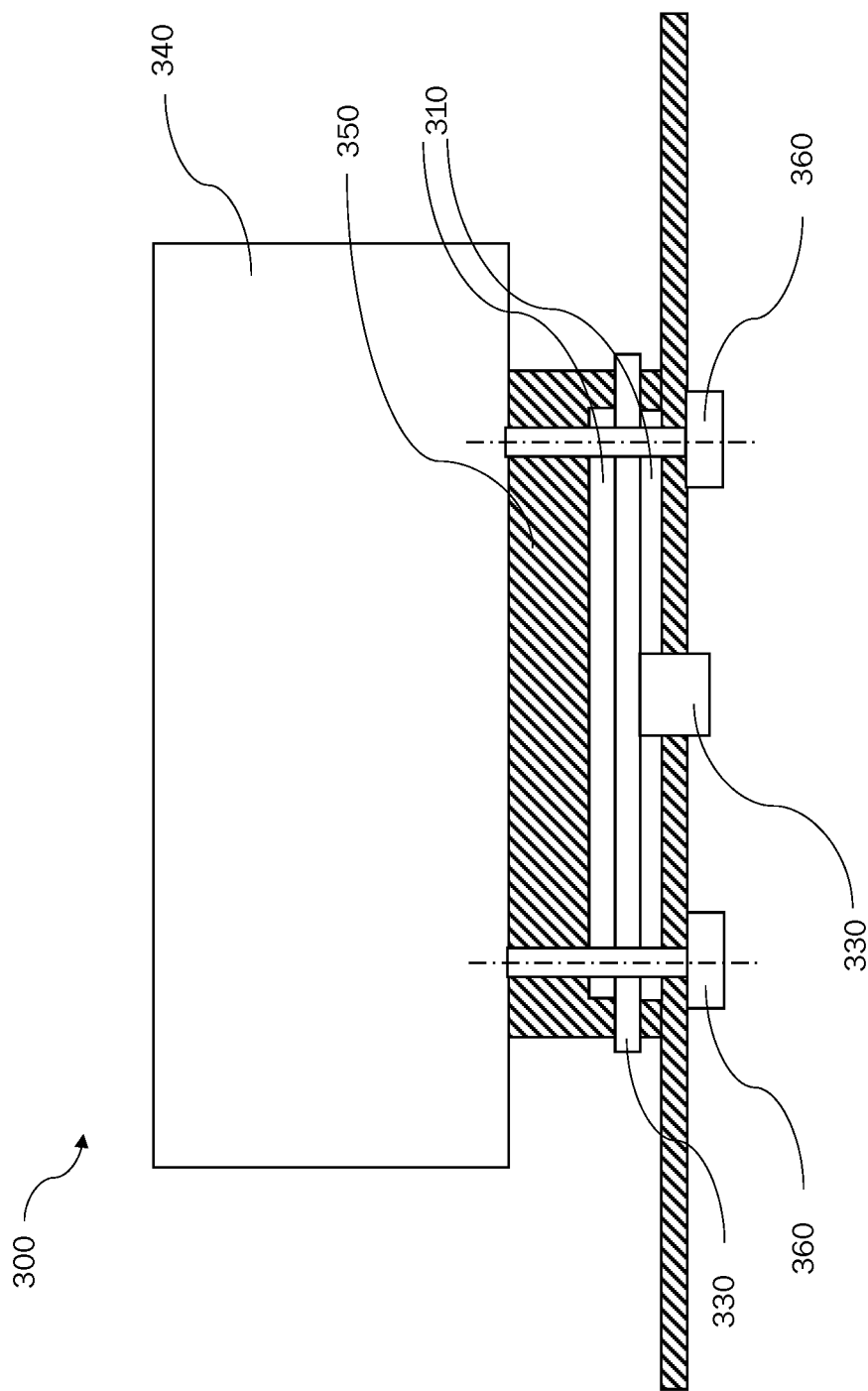

An example of such configuration is schematically illustrated in FIG. 3. In this example, the space vehicle element 300 comprises a first part 340, which can be a space mechanism or other equipment, for example. The space vehicle element 300 further comprises a second part 360 that serves as a fixation part for fixing the space vehicle element 300 to a mounting interface 350 of the space vehicle. In this example, the fixation part corresponds to or includes one or more mounting bolts. The space vehicle element 300 further comprises a heat generating part 310 that can sever the mounting bolts when ignited. By severing the mounting bolts or sufficiently demising the material interfacing with the bolts, the first (main) part 340 of the space vehicle element 300 is severed from the mounting interface 350, and thereby from the space vehicle. The heat generating part 310 in the example of FIG. 3 has a plate-like shape with a hollow formed along its center plane. A fuse 330 is arranged along this hollow. Part of the fuse 330 may extend through a casing or wall of the heat generating part 310. This part of the fuse 330 may, for example, extend towards the space vehicle element and/or may reach towards a location at which the heat generated by atmospheric friction during re-entry results in a higher temperature.

Whenever the space vehicle element is broken up into parts or severed from the space vehicle, it may also be necessary to aid the demise of the individual resulting parts during re-entry. This requirement is catered to in the implementations and embodiments described next.

Accordingly, in some embodiments, the space vehicle element can further comprise a second heat generating part. Also the second heat generating part comprises a metallo-thermal composition (second metallo-thermal composition) for providing additional heat during re-entry of the space vehicle into the atmosphere by an exothermic reaction of the (second) metallo-thermal composition. In this configuration, the second heat generating part is arranged in contact (e.g., in thermal contact or in close proximity) with one of the first part or the second part of the space vehicle element, for expediting the destruction of the one of the first part or the second part of the space vehicle element by the additional heat provided by the second heat generating part. Then, after the first and second parts of the space vehicle element are severed from each other during re-entry, either or both of the first and second parts can be individually demised. Needless to say, the space vehicle element may comprise more than the first and second heat generating parts to achieve this aim.

When multiple heat generating parts are present in the space vehicle element, it can be advantageous to impose a predetermined sequence on the ignition timings of the heat generating parts. This can be achieved by appropriately adjusting the arrangement of the respective heat generating parts (e.g., with respect to their proximity to a heat source that generates heat during re-entry) within the space vehicle element or space vehicle, by appropriately adjusting the composition of the metallo-thermal compositions of the respective heat generating parts (e.g., by appropriate selection of the particle size and/or shape of the metallo-thermal compositions), and/or by providing fuses with an appropriate activation sequence by controlling their respective ignition temperatures.

For example, the second heat generating part can be configured such that the exothermic reaction of the second metallo-thermal composition is activated after the exothermic reaction of the metallo-thermal reaction is activated, so that the second heat generating part provides the additional heat for expediting the destruction of the one of the first part or the second part of the space vehicle element after the connecting section between the first part and the second part of the space vehicle element has been severed.

In general, the space vehicle element can comprise first and second heat generating parts as described above, for expediting the destruction of the space vehicle element by the additional heat provided by the first and second heat generating parts. In this configuration, it can be of advantage if the first and second heat generating parts are configured such that the exothermic reactions of their respective metallo-thermal compositions are activated in a predetermined sequence. Needless to say, the space vehicle element can comprise more than two heat generating parts and the more than two heat generating parts can be arranged/configured to ignite in a predetermined sequence.

While not strictly necessary for achieving this aim, a predetermined sequence of ignition timings of heat generating parts can be ensured by appropriate choice of fuses for the heat generating parts. Fuses for heat generating parts in the context of the present disclosure will be described below.

Figure 4B:
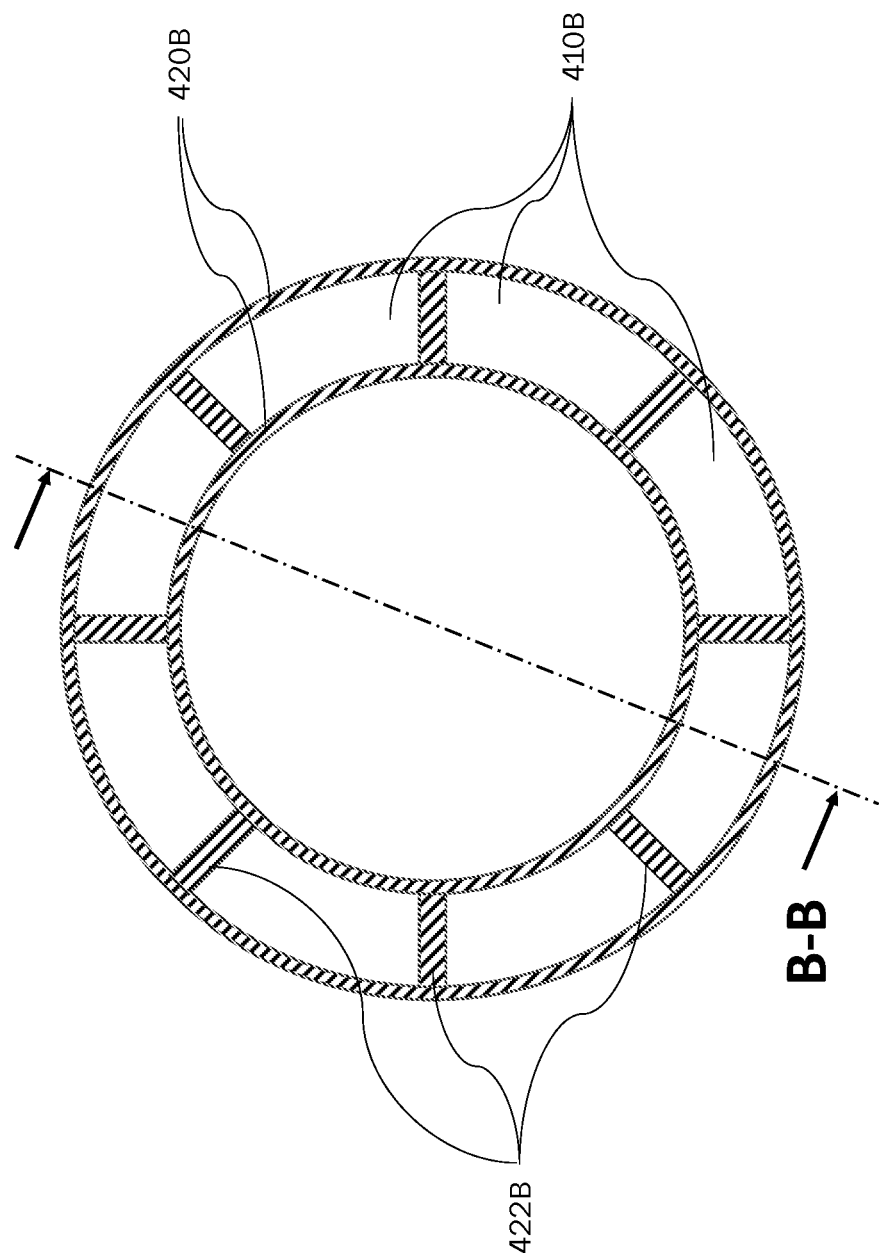
Figure 4C:
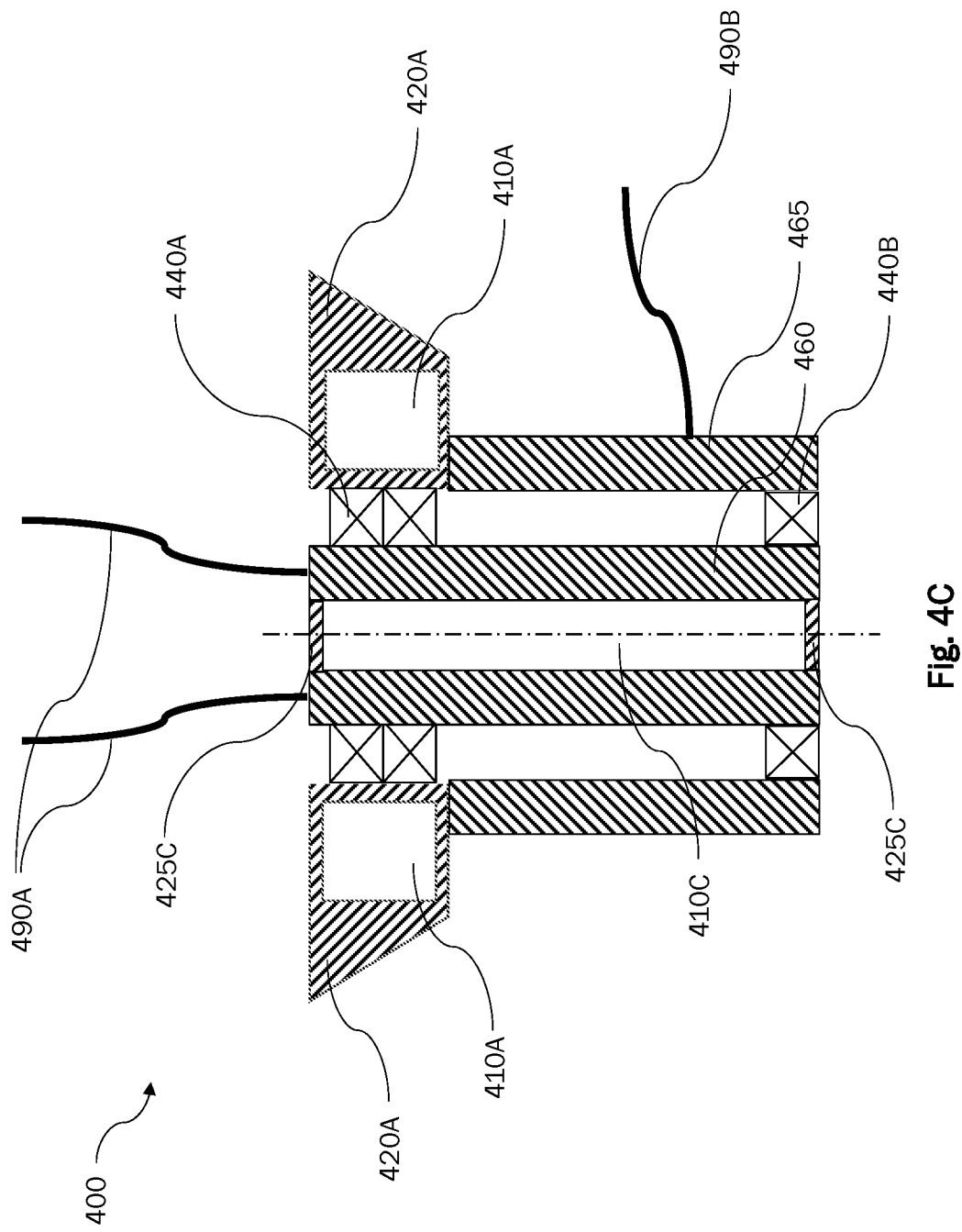

An example of a space vehicle element that combines at least some of the above implementations is described next with reference to the schematic illustrations of FIG. 4A, FIG. 4B, and FIG. 4C. These figures show different views of a solar array drive mechanism (SADM) 400 for driving a solar array of the space vehicle. FIG. 4A shows a vertical section through the substantially axially symmetric SADM 400, along the axis of the SADM 400. FIG. 4C shows a simplified version of FIG. 4A that omits some elements of the SADM 400 for simplicity and illustrative purposes. FIG. 4B shows a top view of a horizontal section (view direction A) through the innermost structural element (structural component, e.g., an adapter) 420B of a top portion of the SADM 400, the latter housing the rotating shaft 420 of the SADM 400. As can be seen from these figures, there are multiple options for arranging the heat generating part(s), such as in a rotor 460 of the SADM 400, between stiffening ribs 422B of the innermost structural element 420B of the top portion of the SADM 400, and/or in hollows formed in the top portion of the SADM, for example.

In more detail, as can be seen from FIG. 4A, the SADM 400 comprises a rotor 460 arranged within a stator 465. Note that elements 460 and 465 can be components of either a slip ring, twist capsule, or cable wrap, for example, all of which could be mounted to a SADM for the purpose of transferring the power generated by the solar array. The rotor 460 is supported by a support bearing 440B. A rotating shaft 420 is mounted at a top end of the rotor 460 and rotates with the rotor 460. The rotor shaft 420 is supported by a main bearing pair 440A that is arranged within a top portion of the SADM 400. The SADM 400 further comprises a motor 480 that drives a pinion gear 482, which in turn engages with a main gear 484. The main gear 484 drives the rotating shaft 420. The pinion gear 482 and the main gear 484 are arranged in the top portion of the SADM 400. The top portion also comprises multiple structural elements, including an outermost structural element 420A and an innermost structural element 420B. Also shown in FIG. 4A are harnesses (harness bundles, e.g., wire harnesses) 490A, 490B of the SADM 400.

A heat generating part 410A can be arranged within a hollow or cavity formed within the outermost structural element 420A of the top portion. A closing lid 425A of the SADM 400 can cover the heat generating part 410A and keep the heat generating part 410A in place. Similarly to the case of the innermost structural element 420B described below, also the outermost structural element 420A can comprise a plurality of stiffening ribs, between adjacent pairs of which respective ones of one or more heat generating parts can be arranged. Since the outermost structural element 420A includes the interface with the space vehicle, the heat generating part 410A would, apart from aiding demise of the outermost structural element 420A, sever the interface with the space vehicle, similar to the example described above with reference to FIG. 3.

Another heat generating part 410B can be arranged a hollow or cavity formed within the innermost structural element 420B of the top portion. A closing lid 425B of the SADM 400 can cover the heat generating part 410B and keep the heat generating part 410B in place. A top view of a horizontal section through the innermost structural element 420B of the top portion of the SADM 400 is shown in FIG. 4B. As can be seen from this figure, a plurality of stiffening ribs 422B are formed between an inner member (in radial direction) and an outer member (in radial direction) of the innermost structural element 420B. Multiple heat generating parts 410B can be arranged between respective pairs of adjacent stiffening ribs 422B. These heat generating parts help demise a massive part of the SADM around the main bearing pair 440A.

Yet another heat generating part 410C can be arranged along a center of the rotor 460. The heat generating part 410C can be kept in place by closing lids 425C. This heat generating part helps demise the rotor 460 and the rotor shaft 420 of the SAMD 400.

Each of the aforementioned heat generating parts comprises (or in some cases consists of) a metallo-thermal composition, such as thermite, for example. Fuses for each of the heat generating parts can be added through respective closing lids.

Any or each of the harness bundles 490A, 490B can be provided with a respective heat generating part that at least partially surrounds the harness bundle, for severing the harness bundle during re-entry of the space vehicle. These heat generating parts may be configured as the heat generating part described above with reference to the example of FIG. 2. For example, these heat generating parts may have annular shape and encircle respective harness bundles.

In a most basic implementation of the disclosure, the heat generating part is configured such that the metallo-thermal composition is ignited by a thermal flux created by atmospheric friction during re-entry of the space vehicle into the atmosphere. The heat generating part may be specifically arranged and configured to achieve this aim. That is, the heat generating part may be designed (e.g., with regard to the composition, particle size, and/or particle shape of the metallo-thermal composition), possibly in dependence on an arrangement of the heat generating part within the space vehicle (e.g., in dependence on its distance from a heat generating surface of the space vehicle element, etc.), such that it is reliably ignited by the thermal flux created by atmospheric friction during re-entry of the space vehicle into the atmosphere.

Alternatively, in some embodiments the space vehicle element can comprise one or more fuses for igniting the heat generating part(s).

Examples of fuses for igniting the metallo-thermal composition of the heat generating part will be described next.

For example, the fuse can be a passive fuse. The passive fuse is provided to conduct heat from the heat flux (caused by atmospheric friction during re-entry) to the heat generating part. For example, the (passive) fuse can comprise a heat conducting part for transferring heat generated by the thermal flux to the heat generating part, for activating the exothermic reaction of the metallo-thermal composition. One end of the (passive) fuse may reach closer (e.g., further) towards a surface of the space vehicle than the heat generating part, while another end is in contact (e.g., in thermal contact or in close proximity) with the heat generating part. The (passive) fuse may be a copper element (e.g., a rod), for example, or an element formed of any other material with good heat conductivity and sufficiently high melting/disintegration temperature (e.g., higher than the ignition temperature of the metallo-thermal composition it is supposed to ignite). Since a copper element only melts at temperatures beyond 1000° C. (deg C), it can conduct sufficient heat for igniting the metallo-thermal composition to the heat generating part long before the entire space vehicle element is heated to ignition temperatures, thereby accelerating ignition of the metallo-thermal composition. The heat conducting element can be configured in such a way to optimize the ignition, for example by maximizing the contact area between the heat conducting element and the metallo-thermal composition (i.e., the heat generating part).

As another example, the fuse can be thermally coupled to the heat generating part. The fuse can be configured to be activated by a thermal flux created by atmospheric friction during re-entry of the space vehicle into the atmosphere. Upon activation, the fuse then can provide sufficient heat for igniting the metallo-thermal composition of the heat generating part. Such a fuse can be referred to as an active fuse.

An example of an active fuse is a fuse using an exothermic hypergolic reaction, such as a reaction between potassium permanganate (first substance/agent) and glycerol or ethylene glycol (second substance/agent), for example. Any hypergolic reaction is feasible in the context of the disclosure, as long as it is sufficiently powerful to start the reaction of the metallo-thermal composition. The hypergolic reaction can be started by melting a container separating the first and second substances. Optionally, melting the container can be aided by a passive fuse.

In other words, the fuse can comprise two separated chambers having contained therein respective agents (e.g., chemical agents) and a dividing section (e.g., a dividing wall) arranged between and separating the chambers. The two agents are chosen to spontaneously ignite and undergo an exothermic reaction when being brought into contact with each other (i.e., undergo an exothermic hypergolic reaction). This fuse is configured such that the dividing section is made permeable or destroyed by the heat generated by the thermal flux during re-entry. The agents may mix if the dividing section is made permeable or destroyed. The dividing section may be configured to be made permeable or destroyed at a predetermined, tunable temperature (e.g., tunable by choice of material, thickness, etc., of the dividing section). For example, the dividing section may have a predetermined melting temperature. It is understood that the casing of the two separated chambers other than the dividing section is configured (e.g., by choice of material and/or thickness) to not be made permeable or destroyed by the thermal flux until after the dividing section is made permeable, so that the two agents can mix and react with each other. The exothermic reaction may generate sufficient heat or energy to start the reaction of the metallo-thermal composition or ignite the metallo-thermal composition.

Another example of an active fuse is a fuse derived from flares or sparklers. Such a fuse comprises a slow burning pyrotechnic composition, possibly added (e.g., as a coating) to a metal wire (e.g., a stiff metal wire). The pyrotechnic composition may comprise metallic fuel (e.g., Al, Fe, Ti, ferrotitanium), an oxidizer (e.g., potassium nitrate, barium nitrate, strontium nitrate, etc.), and possibly a binder. Ignition temperatures of such active fuse can be tailored by the use of different materials/constituents for the pyrotechnic composition. Fuse shapes can be easily manipulated using a metal wire of appropriate shape. For example, the fuse can reach from a location where temperatures are sufficient for igniting the fuse towards the heat generating part. Then, the pyrotechnic composition (e.g., coating) would burn up along the metal wire, eventually igniting the metallo-thermal composition of the heat generating part.

In other words, the fuse can comprise a pyrotechnic or metallo-thermal composition coating and an optional metal wire, at least partially coated by the pyrotechnic or metallo-thermal composition.

Next, an example of technical results of embodiments of the disclosure will be described in an illustrative manner, to show feasibility of the proposed solution. An analytical estimate, that is to be understood rather in the sense of an order-of-magnitude estimate, has been made of the amount of thermite (as an example of a metallo-thermal composition or pyrotechnic composition of metal powder) required to heat equipment to the melting temperature currently deemed hard to demise, for the specific case of a reaction wheel's ball bearing assembly. The ball bearing assembly typically survives re-entry when using current approaches for its demise. The analytical estimate proves that the amount of thermite required for achieving demise of the ball bearing assembly is feasible for introduction into the existing design of the ball bearing assembly.

The ball bearing assembly for the analytical analysis is simplified as 0.5 kg of AISI 440C stainless steel. The thermite mixture used is $Fe_2O_3+Al$, with an ignition temperature of 650° C. AISI 440C has a melting temperature of approximately 1500° C.

For calculating the mass of thermite required to heat the ball bearing assembly to its melting temperature, the following assumptions are made: all energy from the exothermic reaction is used to heat the ball bearing assembly and no additional energy from the re-entry is introduced after the ignition temperature is reached to reach the melting temperature (which is a very conservative assumption).

The energy needed to heat metal to melting temperature is given by $Q=m \cdot c \cdot \Delta T$, with $\Delta T$ being the temperature difference between the ignition temperature $T1$ of the thermite and the melting temperature $T2$ of the metal, c being the specific heat of the metal, and m being the mass of the metal. For the specific example ($T1=650°$ C., $T2=1500°$ C., $\Delta T=850$ K, $c=0.46$ kJ/kg/K, $m=0.5$ kg), the required heat is $Q=195.5$ kJ. For thermite including $Fe_2O_3$ as oxidizer and Aluminum as metal, the heat release is $\Delta h=3.98$ kJ/g. Thus, 49 g of thermite are needed for demising the ball bearing assembly assumed for this analysis. With a specific density $\rho=4.25$ g/cm$^3$, this amounts to a volume V=11.6 cm$^3$ of the required thermite. This mass and volume of the thermite is acceptable and well within budget when using a heritage design for the ball bearing assembly, even though more mass may be required for the casing (e.g., cartridge) holding the thermite. Moreover, for newly designed demisable equipment, thermite (or any heat generating part including a metallo-thermal composition or pyrotechnic composition of metal powder in general) may be integral to the design right from the start.

Additional heat may be required to achieve a change of state (i.e., melting) of the ball bearing assembly. This additional heat can come from additional thermite or from the heat flux caused by atmospheric friction during re-entry.

In addition, a qualitative assessment of certain potential risks has been made.

Safety: No specific safety/handling is required during the Assembly, Integration, and Test (AIT) process. As soon as the metallo-thermal composition (e.g., thermite) is enclosed, only very high temperatures can ignite it. This would never occur under realistic conditions. Even open flame is insufficient to ignite most thermite mixtures. Thermite is deemed safer to handle than pyrotechnic compositions. More care is required for fuses with lower ignition temperatures.

Space environment: No chemical/radiation degradation or aging is expected for this material.

Inadvertent ignition: Temperature, radiation, mechanical shock and vibration, Electro-Static Discharge (ESD), and electro-magnetic fields have all been discarded as a source of inadvertent ignition of the metallo-thermal composition. The only potentially credible ignition event could be a direct impact from a micrometeoroid (with sufficiently high energy). This potential issue can be mitigated at the spacecraft level.

It should be noted that the apparatus features described above may correspond to respective method (e.g., manufacturing method) features that may not be explicitly described, for reasons of conciseness, and vice versa. The disclosure of the present document is considered to extend also to such method and vice versa.

Thus, while a space vehicle element in accordance with embodiments of the present disclosure has been described above, the present disclosure likewise relates to a method of manufacturing such a space vehicle element. The aim is that the space vehicle element is configured to be destroyed during re-entry of the space vehicle into the atmosphere. An example of such method 500 is illustrated in FIG. 5. The method 500 comprises, at step S510, providing a space vehicle element. At step S520, a heat generating part is provided. The heat generating part comprises a metallo-thermal composition for providing additional heat during re-entry of the space vehicle into the atmosphere by an exothermic reaction of the metallo-thermal composition, for expediting the destruction of the space vehicle element by the additional heat provided by the heat generating part. The method further comprises, at step S530, integrating the heat generating part within the space vehicle element. As a further step (not shown in FIG. 5), the method may further comprise a step of adding a fuse for activating the metallo-thermal composition of the heat generating part. The fuse may be added after the actual manufacture of the space vehicle element has been finished, or even after the space vehicle element has been mounted on the space vehicle, to reduce any risks related to inadvertent ignition of the fuse, e.g., during on ground testing.

It should further be noted that the description and drawings merely illustrate principles of the proposed method and system. Those skilled in the art will be able to implement various arrangements that, although not explicitly described or shown herein, embody the principles of the disclosure and are included within its spirit and scope. Furthermore, all examples and embodiments outlined in the present document are principally intended expressly to be only for explanatory purposes to help the reader in understanding the principles of the proposed method and system. Furthermore, all statements herein providing principles, aspects, and embodiments of the disclosure, as well as specific examples thereof, are intended to encompass equivalents thereof.

In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A space vehicle element configured to be demised during re-entry of a space vehicle into the atmosphere, the space vehicle element comprising:
    a heat generating part comprising a pyrotechnic composition for providing additional heat during re-entry of the space vehicle into the atmosphere by an exothermic reaction of the pyrotechnic composition, for expediting the demise of the space vehicle element by the additional heat provided by the heat generating part, the pyrotechnic composition comprising metal powder;
    wherein the heat generating part is at least partially integrated within the space vehicle element or at least partially surrounds a portion of the space vehicle element;
    wherein the heat generating part is arranged in a recess or cavity provided in the space vehicle element; and
    wherein the pyrotechnic composition is ignited by a thermal flux created by atmospheric friction during re-entry of the space vehicle into the atmosphere.

2. The space vehicle element according to claim 1, wherein the heat generating part is arranged in contact with a connecting section between a first part of the space vehicle element and a second part of the space vehicle element, so that the additional heat provided by the heat generating part expedites severing the connecting section during re-entry of the space vehicle into the atmosphere.

3. The space vehicle element according to claim 2, wherein the heat generating part is shaped to at least partially enclose the connecting section between the first part of the space vehicle element and the second part of the space vehicle element.

4. The space vehicle element according to claim 2, wherein the second part is a fixation part for fixing the space vehicle element to a portion of the space vehicle.

5. The space vehicle element according to claim 2, wherein the heat generating part is a first heat generating part, the space vehicle element further comprising a second heat generating part, the second heat generating part comprising a second pyrotechnic composition for providing additional heat during re-entry of the space vehicle into the atmosphere by an exothermic reaction of the second pyrotechnic composition, the second pyrotechnic composition comprising metal powder, wherein the second heat generating part is arranged in contact with one of the first part or the second part of the space vehicle element, for expediting the demise of the one of the first part or the second part of the space vehicle element by the additional heat provided by the second heat generating part.

6. The space vehicle element according to claim 5, wherein the second heat generating part is configured such that the exothermic reaction of the second pyrotechnic composition is activated after the exothermic reaction of the pyrotechnic composition of the first heat generating part is activated, so that the second heat generating part provides the additional heat for expediting the demise of the one of the first part or the second part of the space vehicle element after the connecting section between the first part and the second part of the space vehicle element has been severed.

7. The space vehicle element according to claim 1, wherein the heat generating part is arranged in a vicinity of a structural connection between the space vehicle element and the space vehicle, such that severing the structural connection during re-entry of the space vehicle into the atmosphere is expedited by the additional heat provided by the heat generating part.

8. The space vehicle element according to claim 1, wherein the heat generating part is a first heat generating part, the space vehicle element further comprising a second heat generating part, the second heat generating part comprising a second pyrotechnic composition for providing additional heat during re-entry of the space vehicle into the atmosphere by an exothermic reaction of the second pyrotechnic composition, for expediting the demise of the space vehicle element by the additional heat provided by the second heat generating part, the second pyrotechnic composition comprising metal powder, wherein the first and second heat generating parts are configured such that the exothermic reactions of their respective first and second pyrotechnic composition are activated in a predetermined sequence and/or with predetermined relative timing.

9. The space vehicle element according to claim 1, further comprising a fuse for igniting the pyrotechnic composition,
wherein the fuse is thermally coupled to the heat generating part; and
wherein the fuse is activated by the thermal flux created by atmospheric friction during re-entry of the space vehicle into the atmosphere.

10. The space vehicle element according to claim 9, wherein the fuse comprises a heat conducting part for transferring heat generated by the thermal flux to the heat generating part, for activating the exothermic reaction of the pyrotechnic composition.

11. The space vehicle element according to claim 9, wherein the fuse comprises:
two separated chambers having contained therein respective agents; and
a dividing section arranged between and separating the two chambers,
wherein the respective agents in the two chambers are chosen to spontaneously ignite and undergo an exothermic reaction when being brought into contact with each other; and
wherein the fuse is configured such that the dividing section is made permeable or destroyed by the heat generated by the thermal flux.

12. The space vehicle element according to claim 9, wherein the fuse comprises:
a pyrotechnic or metallo-thermal composition coating; and
an optional metal wire, at least partially coated by the pyrotechnic or metallo-thermal composition.

13. The space vehicle element according to claim 1, wherein the space vehicle element is a reaction wheel that is usable for maneuvering the space vehicle;
wherein the reaction wheel comprises a ball bearing assembly; and
wherein the heat generating part is arranged along a center of the ball bearing assembly.

14. The space vehicle element according to claim 1, wherein the space vehicle element is a solar array drive mechanism for driving a solar array of the space vehicle; and
wherein the heat generating part is arranged in a rotor shaft of the solar array drive mechanism or between stiffening ribs of a structural component of the solar array drive mechanism.

15. A space vehicle element configured to be demised during re-entry of a space vehicle into the atmosphere, the space vehicle element comprising:
a heat generating part comprising a pyrotechnic composition for providing additional heat during re-entry of the space vehicle into the atmosphere by an exothermic reaction of the pyrotechnic composition, for expediting the demise of the space vehicle element by the additional heat provided by the heat generating part, the pyrotechnic composition comprising metal powder,
wherein the heat generating part is at least partially integrated within the space vehicle element or at least partially surrounds a portion of the space vehicle element, and
wherein the pyrotechnic composition is ignited by a fuse of the space vehicle element, wherein the fuse is thermally coupled to the heat generating part, and the fuse is activated by a thermal flux created by atmospheric friction during re-entry of the space vehicle into the atmosphere.

16. The space vehicle element according to claim 15, wherein the fuse comprises a heat conducting part for transferring heat generated by the thermal flux to the heat generating part, for activating the exothermic reaction of the pyrotechnic composition.

17. The space vehicle element according to claim 15, wherein the fuse comprises:
two separated chambers having contained therein respective agents; and
a dividing section arranged between and separating the two chambers,
wherein the respective agents in the two chambers are chosen to spontaneously ignite and undergo an exothermic reaction when being brought into contact with each other, and
wherein the fuse is configured such that the dividing section is made permeable or destroyed by the heat generated by the thermal flux.

18. The space vehicle element according to claim 15, wherein the fuse comprises:
a pyrotechnic or metallo-thermal composition coating; and
an optional metal wire, at least partially coated by the pyrotechnic or metallo-thermal composition.

19. A space vehicle element configured to be demised during re-entry of a space vehicle into the atmosphere, the space vehicle element comprising:
a heat generating part comprising a pyrotechnic composition for providing additional heat during re-entry of the space vehicle into the atmosphere by an exothermic reaction of the pyrotechnic composition, for expediting the demise of the space vehicle element by the additional heat provided by the heat generating part, the pyrotechnic composition comprising metal powder, wherein the heat generating part is at least partially integrated within the space vehicle element or at least partially surrounds a portion of the space vehicle element, wherein the heat generating part is arranged in a recess or cavity provided in the space vehicle element, and wherein the heat generating part is a first heat generating part, the space vehicle element further comprising a second heat generating part, the second heat generating part comprising a second pyrotechnic composition for providing additional heat during re-entry of the space vehicle into the atmosphere by an exothermic reaction of the second pyrotechnic composition, the second pyrotechnic composition comprising metal powder.

* * * * *